(12) United States Patent
Judge (10) Patent No.: US 10,633,038 B2
(45) Date of Patent: Apr. 28, 2020

(54) TRAILER WITH AT LEAST ONE MOVABLE INNER WALL

(71) Applicant: Matthew Lee Judge, Burlington, KY (US)

(72) Inventor: Matthew Lee Judge, Burlington, KY (US)

( * ) Notice: Subject to any disclaimer, the term of this patent is extended or adjusted under 35 U.S.C. 154(b) by 144 days.

(21) Appl. No.: 15/896,429

(22) Filed: Feb. 14, 2018

(65) Prior Publication Data

US 2019/0248426 A1    Aug. 15, 2019

(51) Int. Cl.
*B62D 33/04* (2006.01)
*B60P 3/06* (2006.01)
*B60P 3/34* (2006.01)
*B62D 33/027* (2006.01)
*B62D 53/06* (2006.01)

(52) U.S. Cl.
CPC ............... *B62D 33/04* (2013.01); *B60P 3/06* (2013.01); *B60P 3/34* (2013.01); *B62D 33/027* (2013.01); *B62D 33/042* (2013.01); *B62D 53/06* (2013.01)

(58) Field of Classification Search
CPC ......... B62D 33/04; B62D 33/027; B60P 3/06; B60P 3/34
USPC .............................. 296/190.09, 24.4
See application file for complete search history.

(56) References Cited

U.S. PATENT DOCUMENTS

| 8,186,917 B2* | 5/2012 | Nelson | B60P 3/205 410/129 |
| 2014/0008932 A1* | 1/2014 | Fought | B62D 63/08 296/24.4 |
| 2017/0008575 A1* | 1/2017 | Jennison | B62D 33/08 |

* cited by examiner

*Primary Examiner* — Pinel E Romain
(74) *Attorney, Agent, or Firm* — Steve Witters; Witters & Associates (57) ABSTRACT

The present disclosure provides a trailer having a portion configurable for dual use and a method of transforming a portion of the trailer. The trailer has at least one moveable inner wall configured to move toward the front wall of the trailer to a first position and away from the front wall to a second position. The first position of the at least one movable inner wall defines an enclosure to have a first volume and the second position of the at least one movable inner wall defines the enclosure to have a second volume, wherein the first volume is less than the second volume.

18 Claims, 4 Drawing Sheets

TRAILER WITH AT LEAST ONE MOVABLE INNER WALL

FIELD OF THE DISCLOSURE

Aspects of the present disclosure generally relate to trailers and methods for utilizing trailers, more specifically toward a trailer that is transformable.

BACKGROUND

Background information is for informational purposes only and does not necessarily admit that subsequently mentioned information and publications are prior art.

Trailers have been used for many years for a variety of functions, For example, house trailers are used for lodging. Utility trailers are used for hauling or moving a variety of items or goods. Live stock, horse trailers, and other trailers are also commonly used.

Many trailers have an enclosed volume, such as house trailers, livestock or horse trailers, and other trailers may have an enclosed volume with a door. Typically, trailers having an enclosed volume are designed for a specific purpose such as lodging, moving livestock, horses, goods, or other items. It may be desirous for a trailer with an enclosed volume to be transformable and provide different designs of enclosure(s) for different purposes.

SUMMARY

According to one aspect of the present disclosure, a trailer comprises a floor, a first sidewall extending up from a first side of the floor, a second sidewall extending up from a second side of the floor, a front wall extending up from a front of the floor and joining with the first sidewall and the second sidewall, and a top wall extending from the first sidewall, the second sidewall, and front wall. A moveable inner wall is configured to move toward the front wall to a first position and away from the front wall to a second position. The first position of the at least one movable inner wall defines an enclosure to have a first volume and the second position of the at least one movable inner wall defines the enclosure to have a second volume, wherein the first volume is less than the second volume.

In another aspect of the present disclosure, a method of changing a volume of an enclosure in a trailer is provided. The trailer has a floor, a first sidewall extending up from a first side of the floor, a second sidewall extending up from a second side of the floor, a front wall extending up from a front of the floor and joining with the first sidewall and the second sidewall, a top wall extending from the first sidewall, the second sidewall, and front wall, and a moveable inner wall. The method comprises positioning the at least one movable inner wall at a first position and defining a first volume within the floor, the first sidewall, the second sidewall, and the top wall and moving the at least one movable inner wall to a second position and defining a second volume within the floor, the first sidewall, the second sidewall, and the top wall, wherein the first volume is different than the second volume.

In another aspect of the present disclosure, a trailer insert is provided. The trailer insert has a vertical movable inner wall configured to be inserted into a trailer. A moving and stabilization device is configured for the movement and stabilization of the vertical movable inner wall. The vertical movable inner wall is configured to move toward a front wall of the trailer to a first position and away from the front wall of the trailer to a second position. The first position of the vertical movable inner wall defines an enclosure to have a first volume and the second position of the vertical movable inner wall defines the enclosure to have a second volume, wherein the first volume is less than the second volume.

These and other features, aspects and advantages of the present disclosure will become better understood with reference to the folio-wing drawings, description and claims.

BRIEF DESCRIPTIONS OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

The following detailed description may provide the best currently contemplated modes of carrying out the disclosure. The description is not to be taken in a limiting sense, but is made merely for the purpose of illustrating the general principles of the disclosure, since the scope of the disclosure is best defined by the appended claims.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, and devices, related to a trailer that has transformable inner volume(s) and may provide the trailer to have a portion for a dual use. The trailer of the present disclosure has a moveable inner wall configured to change the volume of a forward portion of the trailer. The volume of the trailer forward of the at least one movable inner wall may be designed for a purpose such as lodging and the area or volume aft of the inner wall may be designed for a different purpose such as hauling items, livestock, or horses.

In at least one embodiment, the transformable trailer of the present disclosure may be a smaller or more compact trailer and provide the usages that typically require a larger trailer. For example, one may transport more livestock or recreational vehicles and still have the living space desired upon arriving at a destination. The transformation of the trailer of the present disclosure may enable one to gain dual use of at least a portion of the trailer. For example, upon arriving and unloading the items hauled to the destination, a part of the volume used to haul the items may be transformed into living space by moving an inner movable wall toward the rear of the trailer.

For example, when in transit it may be advantageous to have a larger area or volume for hauling livestock, horses, recreational vehicles such as ATVs, or other items. Upon arrival at a destination, the items being hauled may be removed from the trailer. Removal of the items being hauled may free up space in the trailer that may be transformed for a different use.

For example, a moveable inner wall may be used to transform the space freed up with removal of the items being hauled. In at least one embodiment of the present disclosure, the forward volume of the trailer, forward of the movable wall, is designed or configured for human habitation and the aft portion of the trailer, aft of the at least one movable inner wall, is configured for hauling. Upon stopping and removing the items being hauled, the at least one movable inner wall may be moved toward the rear of the trailer to provide a larger living space while at the destination. Prior to departing the destination, the at least one movable inner wall may be moved back to the forward position and the items may be reloaded into the trailer for transport.

Figure 1:
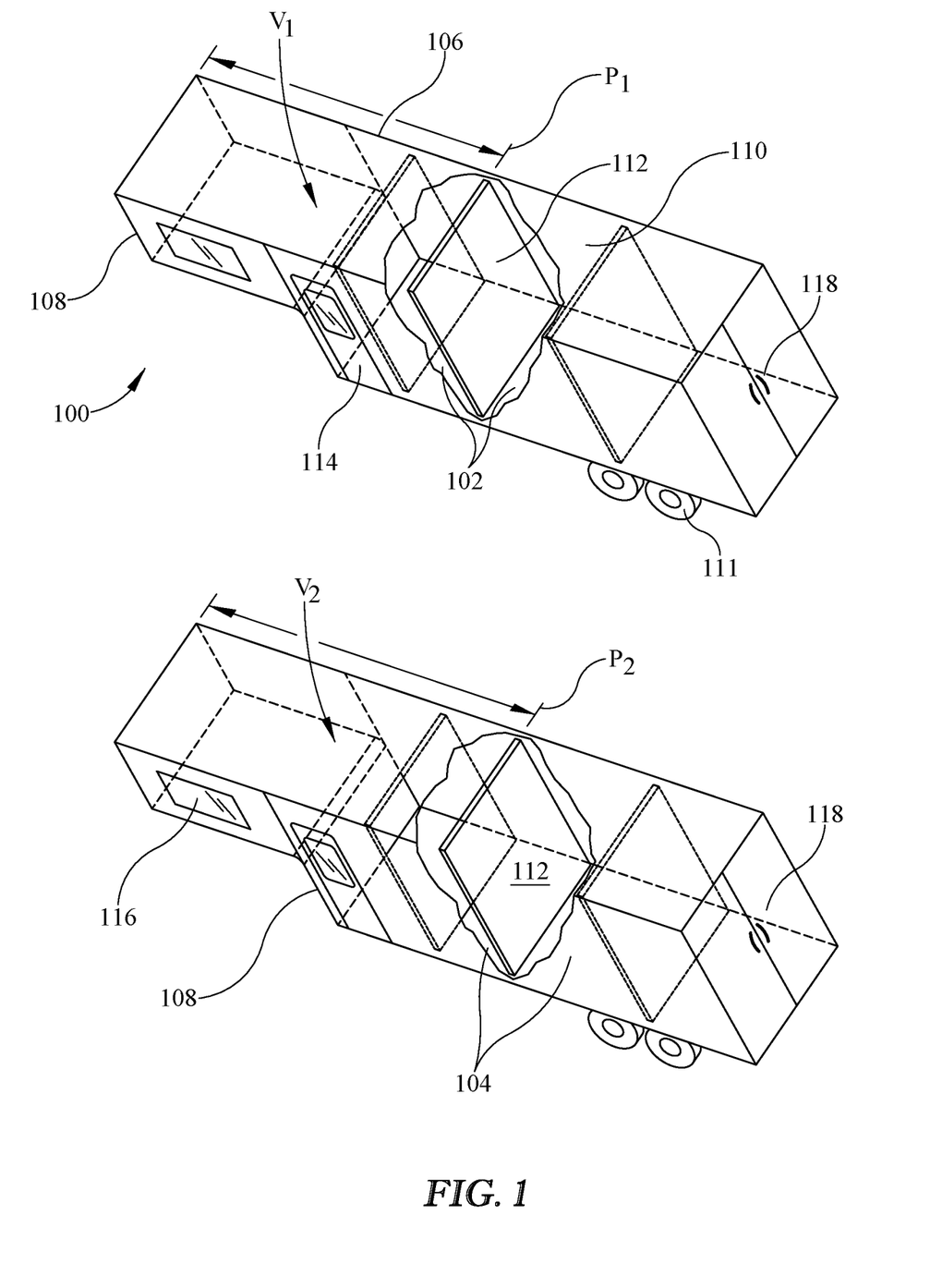
FIG. 1 shows an illustrative embodiment of the trailer of the present disclosure.

FIG. 1 shows an illustrative embodiment of the trailer of the present disclosure. Trailer 100 has a floor 102, a first sidewall 104 extending up from a first side of floor 102 and a second sidewall 106 extending up from a second side of floor 102. Front wall 108 extends up from a front of floor 102 and joins with first sidewall 104 and second sidewall 106.

Top wall 110 extends from first sidewall 104, second sidewall 106, and front wall 108 to form a transformable enclosure. At least one movable inner wall 112 is configured to move toward front wall 108 to a first position P1 and away from front wall 108 to a second position P2. First position, P1, of at least one movable inner wall 112, defines an enclosure to have a first volume V1 and second position P2 of at least one movable inner wall 112 defines the enclosure to have a second volume V2. The first volume V1 is less than second volume V2.

The forward volume of trailer 100, proximate front wall 108, may be configured for human habitation and the area of trailer 100 aft of movable wall 112 may be configured for another purpose such as hauling. In at least one embodiment of the present disclosure, trailer 100 has a rear door 118, or a rear wall, gate, or other structure or device configured to removably hold items in an area or volume aft of movable wall 112.

In at least one embodiment of the present disclosure, V1 and V2 are configured for human habitation. For example, items such as ATVs, horses, livestock, recreational equipment, or other items may be loaded into the area aft of movable wall 112 prior to transport. Upon arriving at a destination, the items being hauled aft of movable wall 112 may be removed which may free up space in trailer 100. This freed up space or volume may be transformed for human habitation. For example, movement of movable wall 112 from P1 to P2 may increase the space for human habitation from V1 to V2. Prior to departing from the destination, movable wall 110 may be moved back to P1 to provide space to load items back onto trailer 100 for transport.

Door 114 may be disposed in one of the sidewalls for entry and exit into and from trailer 100. One or more windows 116 may be disposed in the sidewalls or the front wall. Trailer 100 may have a rear opening or door 118 configured for loading and unloading items that may be transported in the rear of trailer 100

Trailer 100 may have floor 102, first sidewall 104, second sidewall 106, and top wall 110 extend beyond at least one movable inner wall 112 when at least one movable inner wall 112 is in first position P1. Trailer 100 may have floor 102, first sidewall 104, second sidewall 106, and top wall 110 extend beyond at least one movable inner wall 112 when at least one movable inner wall 112 is in second position P2.

In at least one embodiment, trailer 100 has first volume V1 of the enclosure configured to have a first use and the areas of floor 102, first sidewall 104, second sidewall 106, and top wall 110, of the trailer, extending beyond at least one movable inner wall 112, when at least one movable inner wall 112 is in first position P1, configured to have a second use, the first use being different than the second use. For example, the first use may be human habitation and the second use may be a use other than human habitation.

Trailer 100 may have a rear wall extending from first sidewall 104, second sidewall 106, floor 102, and top wall 110, wherein the rear wall is further from front wall 108 than at least one movable inner wall 112. The rear wall may have a door, a gate, a hatch, or another opening, such as door 118. One or more of the sidewalls may have a door, a gate, a hatch, or another opening, such as door 108.

Figure 2:
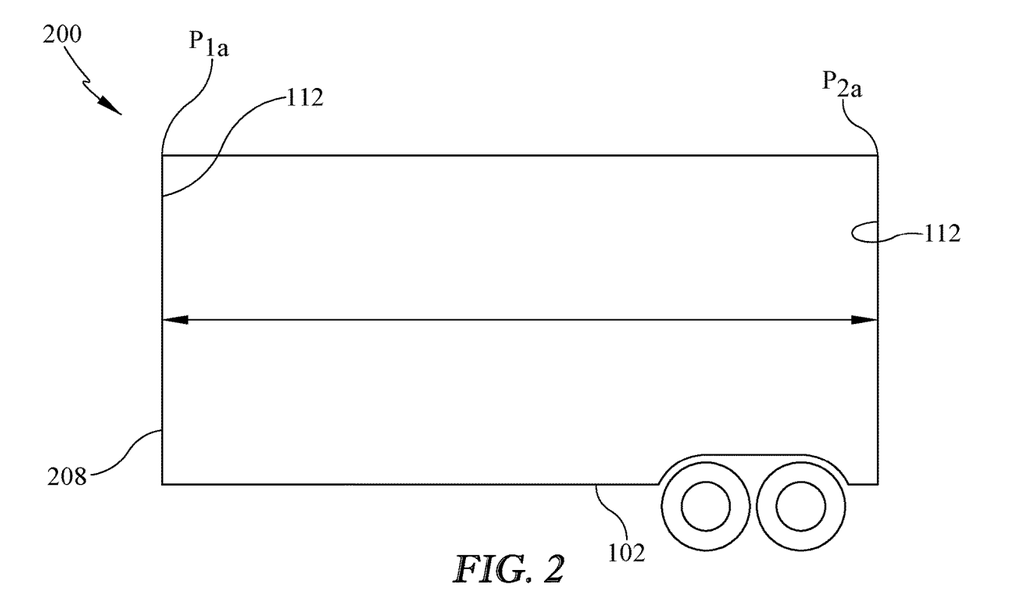
FIG. 2 schematically shows the trailer of the present disclosure having a moveable inner wall configured for moving to different positions.

FIG. 2 schematically shows that the trailer of the present disclosure may be configured for movable wall 112 to be moved to most any position. For example, trailer 200 may be configured for moving movable wall 112 completely forward to position P1a and become adjacent front wall 208, of trailer 200. Trailer 200 may be configured for moving movable wall 112 completely rearward to position P2a. Trailer 200 may not have a rear wall and movable wall 112 may function as a rear wall of trailer 200. It is to be understood that the trailer of the present disclosure may not to be limited to any distance movable wall 112 may be moved within the trailer. The trailer of the present disclosure may be configured for moving at least one movable wall one or more inches or feet. For example, trailer 100, 200, or 301 may be configured for moving at least one movable wall about 4 or more feet, such as about 8 feet. In at least one embodiment, the trailer of the present disclosure is configured for moveable wall 112 to move forward to become proximate a door or fixture in a forward portion of the trailer, such as door 114. In at least one embodiment, the trailer of the present disclosure is configured for moveable wall 112 to move to a rearward or aft position and allow for storage space rearward of movable wall 112, such as P2 shown in FIG. 1.

Figure 3:
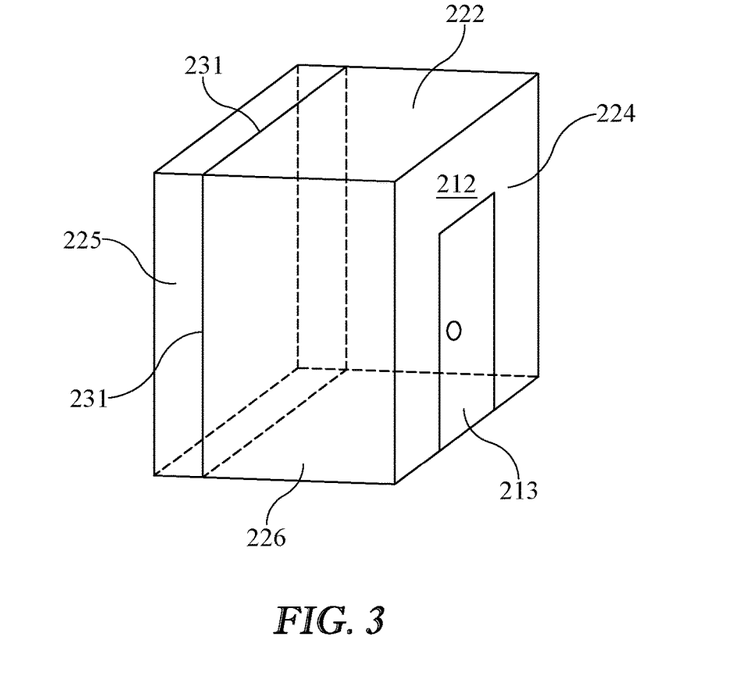
FIG. 3 shows the trailer of the present disclosure having at least one movable inner wall with movable wall and floor portions extending from edges thereof.

FIG. 3 shows movable inner wall 212 having movable wall and floor portions extending from edges thereof. For example, movable inner wall 212 may have at least one movable inner sidewall portion, 224 and 226, extending from a vertical side edge of movable inner wall 212. Movable inner wall 212 may have a movable top wall portion 272 extending from an upper horizontal side edge of the movable inner wall 212. Additionally, movable inner wall 212 may have a movable floor portion 226 extending from a lower horizontal side edge of the movable inner wall 212. Movable sidewall portions 224 and 226, movable top wall portion 272, and movable floor portion 226 may be configured to move toward and away from front wall 108 of the trailer, with movable inner wall 212, and remain proximate, or adjacent, sidewalls 104 and 106, floor 102, and top wall 110 of trailer 100, as shown in FIG. 1. Movable inner wall 212 may have a door, a gate, a hatch, or another opening, such as door 213. Seal 231 may be disposed with an inner portion of a trailer or an outer surface of movable inner wall 212, or wall portions configured to move with movable inner wall 212.

Figure 4:
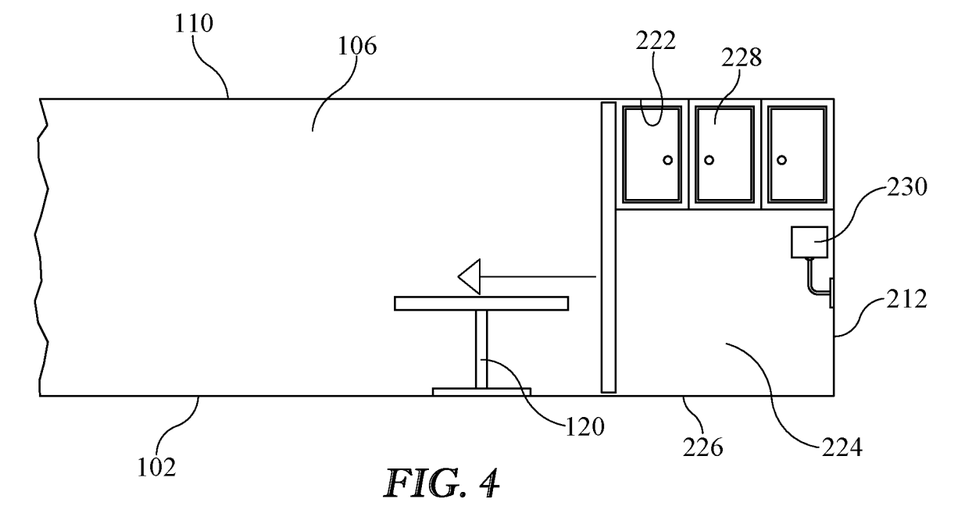
FIG. 4 illustrates the trailer of the present disclosure having fixtures on at least one movable inner portions of the trailer.

The trailer of the present disclosure may have fixtures, furniture, or other appurtenances on one or more of front wall 108, sidewalls 104 and 106, floor 102, top wall 110, movable inner wall 212, movable sidewall portions 224 and 225, movable top wall portion 272, and movable floor portion 226. The fixtures, furniture, or other appurtenances may be disposed to overlap or avoid interfering each other when movable inner wall 212 is moved to a forward position. For example, FIG. 4 shows fixtures, for example cabinets 228, on movable sidewall portions 224, adjacent movable top wall portion 272, and a lamp 230 on movable sidewall 212. Floor 102 has table 120 extending upwardly therefrom. As shown in FIG. 4, movement of fixtures, furniture, or other appurtenances configured to move with the forward movement of movable inner wall 212 avoids interference with the fixtures, furniture, or other appurtenances in the forward portion of the trailer, such as table 120. In at least one embodiment, the presently disclosed trailer has at least one fixture configured and disposed to move with the at least one movable inner wall.

Figure 5:
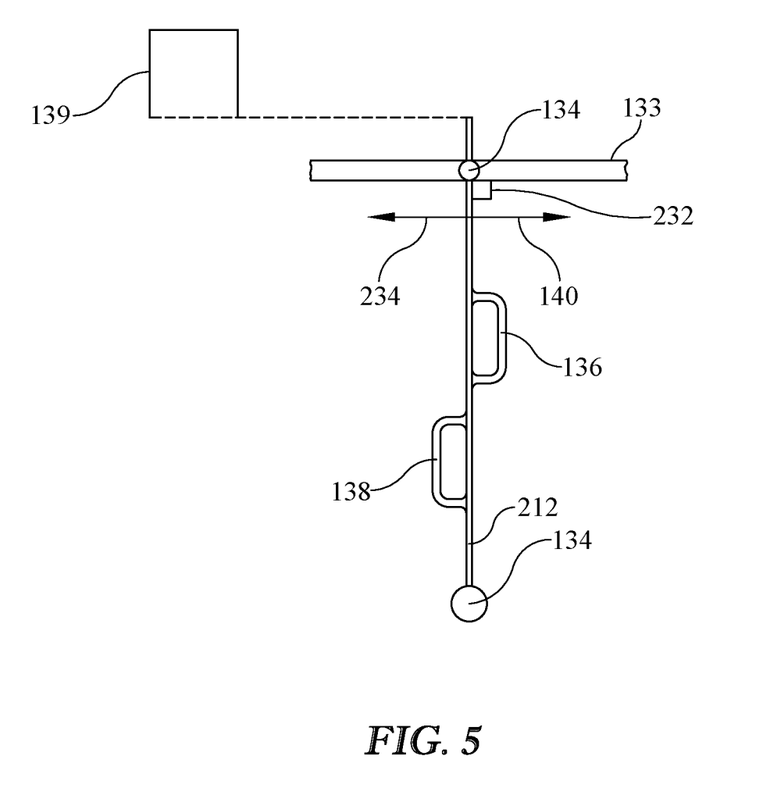
FIG. 5 schematically illustrates features that may be incorporated with the trailer of the present disclosure.

FIG. 5 schematically illustrates features that may be incorporated with the trailer of the present disclosure. Movable inner wall 212 may be moved manually or by power. For example, movable inner wall 212 may have one or more handles, 136 and 138, which may aid in manually moving movable inner wall 212. Alternatively, or additionally, a powered movement device 139, such as an electric motor, may be configured and disposed to electronically move moveable inner wall 212. Movable inner wall 212 may be configured to slide, roll, or move on the floor of the trailer or on tracks. For example, wheels, castors, or slides, 134, may be configured and disposed for moving and stabilizing movable inner wall 212. In at least one embodiment, the trailer of the present disclosure has one or more tracks 133 configured and disposed for moving and stabilizing movable inner wall 212. One or more stops 232 may be positioned in the trailer of the present disclosure for stopping the movement of movable inner wall 212 at a desired position. One or more releasable securing devices 234 may be positioned in the trailer of the present disclosure for releasably securing movable inner wall 212 at a desired position. For example, it may be desired to releasably secure movable inner wall 212 while traveling.

Figure 6:
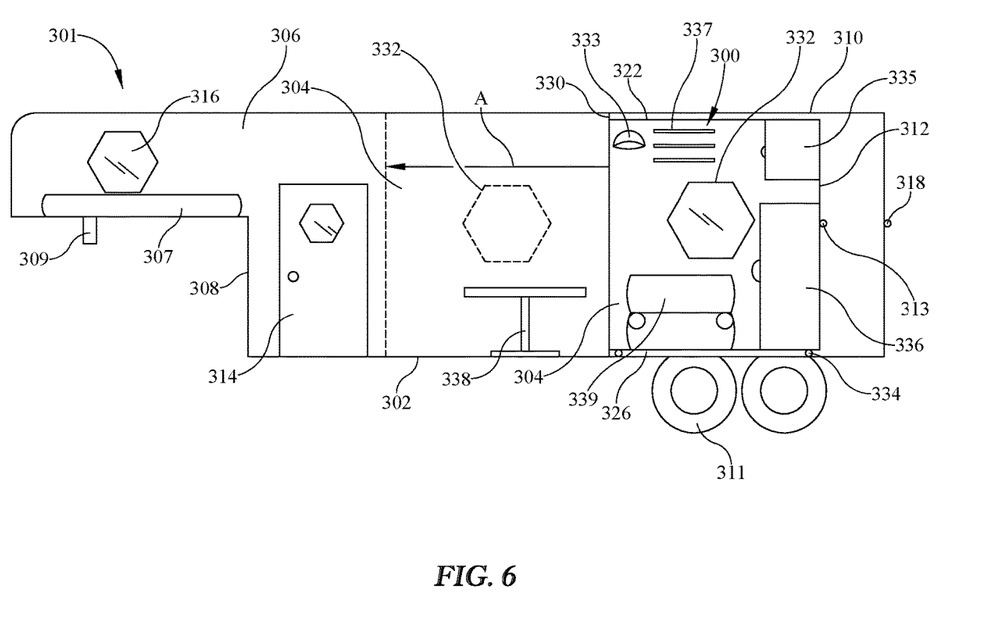
FIG. 6 illustrates a trailer insert of the present disclosure.

FIG. 6 illustratively shows a cross-section of a trailer insert 300 of the present disclosure inserted into trailer 301. Trailer insert 300 has a vertical movable inner wall 312 configured to be inserted into trailer 301. A moving and stabilizing device, for example wheels or casters 334, is configured for the movement and stabilization of vertical movable inner wall 312. Vertical movable inner wall 312 is configured to move toward front wall 308 of trailer 301 to a first position and away from front wall 308 of trailer 301 to a second position.

The first position is illustratively shown in FIG. 6 with the dashed outlines of the forward edge of sidewall 304 and window 332. The first position of vertical movable inner wall 312 defines an enclosure to have a first volume and a second position of vertical movable inner wall 312 defines the enclosure to have a second volume, the first volume is less than the second volume. The second position is illustratively shown in FIG. 6 with the solid outlines of the forward edge of sidewall portion 304 and window 332. In at least one embodiment of the present disclosure, trailer 301 has a window in a sidewall configured and disposed to align with window 332 in sidewall portion 304 when vertical movable inner wall 312 is in the aft or second position, as illustrated with the solid line window 332.

Trailer insert 301 may have at least one of a moveable inner wall portion extending from a vertical side edge of vertical movable inner wall, such as sidewall portion 304, a movable top wall portion 322 extending from an upper horizontal side edge of vertical movable inner wall 312, and a movable floor portion 326 extending from a lower horizontal side edge of vertical movable inner wall 312.

The trailer insert may have at least one fixture, furniture, or other appurtenance configured and disposed to move in trailer 301 with the movement of vertical movable inner wall 312. For example, microwave oven 335 and refrigerator 336 illustrate fixtures or appurtenances that may be held with insert 300 proximate vertical movable inner wall 312.

Optional sidewall portion 304, top wall portion 322, and floor portion 326 may hold one or more fixtures, furniture, or other appurtenances for moving in trailer 301, with the movement of vertical movable inner wall 312. For example, top wall portion 322 may hold a lamp 333, sidewall portion 304 may hold shelves 337, and bottom wall or floor portion 326 may support couch 339.

Trailer 301 may have features such as forward window 316 and mattress 307. A hitch 309 may extend from front wall 308. A sidewall of the trailer may have a door 314 and a window configured and disposed to align with window 332. Floor 302 may support a table 338 which may be positioned to not interfere with a forward movement of movement of vertical movable inner wall 312 and any optional wall, floor, or ceiling portions, as designated with arrow "A".

Trailer insert 300 may have seals 330. For example, seals 330 may be configured and disposed to inhibit air flow between trailer top wall 310 and movable top wall portion 322, trailer sidewall 306 and inner sidewall portion 304, and trailer floor 302 and inner floor portion 326. Trailer 301 may have a rear door 318 and vertical movable inner wall 312 may have a door 313. Trailer 301 and trailer insert 300 may have other features, fixtures, or appurtenances that are known by persons having ordinary skill in the art.

Presently disclosed is a method of changing a volume of an enclosure in a trailer. The trailer has a floor, a first sidewall extending up from a first side of the floor, a second sidewall extending up from a second side of the floor, a front wall extending up from a front of the floor and joining with the first sidewall and the second sidewall. A top wall extends from the first sidewall, the second sidewall, and front wall and a moveable inner wall is disposed in the trailer.

The method comprises positioning the at least one movable inner wall at a first position and defining a first volume within the floor, the first sidewall, the second sidewall, and the top wall. The at least one movable inner wall is moved to a second position which defines a second volume within the floor, the first sidewall, the second sidewall, and the top wall. The first volume is different than the second volume. The at least one movable inner wall may be moved by rolling or sliding the at least one movable inner wall manually or by power. Contemporaneously with the moving of the at least one movable inner wall, at least one of a moveable inner wall portion extending from a vertical side edge of the at least one movable inner wall, a movable top wall portion extending from an upper horizontal side edge of the at least one movable inner wall, and a movable floor portion extending from a lower horizontal side edge of the at least one movable inner wall may be moved. At least one fixture may be moved with the moving of the at least one movable inner wall. For example, a fixture may be disposed on the at least one movable inner wall or sidewall portion, top wall portion, or floor portion extending from the at least one movable inner wall. Upon moving the at least one movable inner wall to a desired position, it may be releasably secured in position. For example, the at least one movable inner wall may be removably secured at a forward or aft position.

Presently disclosed is a trailer having a moveable inner wall. The trailer may have a portion configured for dual use, such as human habitation and transportation of livestock, recreational gear, ATVs, or other items to be transported.

One feature or aspect of an embodiment is believed at the time of the filing of this patent application to possibly reside broadly in a trailer comprising: a floor; a first sidewall extending up from a first side of the floor; a second sidewall extending up from a second side of the floor; a front wall extending up from a front of the floor and joining with the first sidewall and the second sidewall. A top wall extends from the first sidewall, the second sidewall, and the front wall. A moveable inner wall is configured to move toward the front wall to a first position and away from the front wall to a second position, the first position of the at least one movable inner wall defines an enclosure to have a first volume and the second position of the at least one movable inner wall defines the enclosure to have a second volume. The first volume is less than the second volume.

Another feature or aspect of an embodiment is believed at the time of the filing of this patent application to possibly reside broadly in the trailer having a moveable inner wall comprising rollers, wheels, castors, or a track configured to cooperate with the at least one movable inner wall and to ease movement and stabilize the moveable inner wall.

Yet another feature or aspect of an embodiment is believed at the time of the filing of this patent application to possibly reside broadly in the trailer having a moveable inner wall, wherein the floor, the first sidewall, the second sidewall, and the top wall extend beyond the at least one movable inner wall when the at least one movable inner wall is in the first position.

Still another feature or aspect of an embodiment is believed at the time of the filing of this patent application to possibly reside broadly in the trailer having a moveable inner wall, wherein the floor, the first sidewall, the second sidewall, and the top wall extend beyond the at least one movable inner wall when the at least one movable inner wall is in the second position.

A further feature or aspect of an embodiment is believed at the time of the filing of this patent application to possibly reside broadly in the trailer having a moveable inner wall, wherein the first volume of the enclosure is configured to have a first use and the areas of floor, the first sidewall, second sidewall, and the top wall extending beyond the at least one movable inner wall when the at least one movable inner wall is in the first position is configured to have a second use, the first use being different than the second use.

Another feature or aspect of an embodiment is believed at the time of the filing of this patent application to possibly reside broadly in the trailer having a moveable inner wall, wherein the first use is human habitation and the second use is a use other than human habitation.

Yet another feature or aspect of an embodiment is believed at the time of the filing of this patent application to possibly reside broadly in the trailer having a moveable inner wall further comprising at least one movable inner wall portion extending from a vertical side edge of the at least one movable inner wall and toward the front wall.

Still another feature or aspect of an embodiment is believed at the time of the filing of this patent application to possibly reside broadly in the trailer having a moveable inner wall further comprising a movable top wall portion extending from an upper horizontal side edge of the at least one movable inner wall and toward the front wall.

A further feature or aspect of an illustrative example is believed at the time of the filing of this patent application to possibly reside broadly in the trailer having a moveable inner wall further comprising a movable floor portion extending from a lower horizontal side edge of the at least one movable inner wall and toward the front wall.

Another feature or aspect of an illustrative example is believed at the time of the filing of this patent application to possibly reside broadly the trailer having a moveable inner wall further comprising a rear wall extending from the first sidewall, the second sidewall, the floor, and the top wall, the rear wall being further from the front wall that the at least one movable inner wall.

Yet another feature or aspect of an illustrative example is believed at the time of the filing of this patent application to possibly reside broadly in the trailer having a moveable inner wall, wherein the rear wall comprises a door, a gate, a hatch, or another opening.

One feature or aspect of an illustrative example is believed at the time of the filing of this patent application to possibly reside broadly in the trailer having a moveable inner wall, wherein the at least one movable inner wall comprises a door, a gate, a hatch, or another opening.

Another feature or aspect of an illustrative example is believed at the time of the filing of this patent application to possibly reside broadly in the trailer having a moveable inner wall, wherein at least one of the first and second sidewalls comprises a door, a gate, a hatch, or another opening.

Yet another feature or aspect of an illustrative example is believed at the time of the filing of this patent application to possibly reside broadly in the trailer having a moveable inner wall further comprising at least one fixture configured and disposed to move with the at least one movable inner wall.

Still another feature or aspect of an illustrative example is believed at the time of the filing of this patent application to possibly reside broadly in a method of changing a volume of an enclosure in a trailer, the trailer comprising: a floor; a first sidewall extending up from a first side of the floor; a second sidewall extending up from a second side of the floor; a front wall extending up from a front of the floor and joining with the first sidewall and the second sidewall; a top wall extending from the first sidewall, the second sidewall, and front wall; and a moveable inner wall; the method comprising the steps of: positioning the at least one movable inner wall at a first position and defining a first volume within the floor, the first sidewall, the second sidewall, and the top wall; moving the at least one movable inner wall to a second position and defining a second volume within the floor, the first sidewall, the second sidewall, and the top wall, wherein the first volume is different than the second volume.

A further feature or aspect of an illustrative example is believed at the time of the filing of this patent application to possibly reside broadly in the method of changing a volume of an enclosure in a trailer, wherein the step of moving the at least one movable inner wall comprises rolling or sliding the at least one movable inner wall manually or by power.

Another feature or aspect of an illustrative example is believed at the time of the filing of this patent application to possibly reside broadly in the method of changing a volume of an enclosure in a trailer, wherein the step of moving the at least one movable inner wall further comprises moving at least one of a moveable inner wall portion extending from a vertical side edge of the at least one movable inner wall, a movable top wall portion extending from an upper horizontal side edge of the at least one movable inner wall, and a movable floor portion extending from a lower horizontal side edge of the at least one movable inner wall.

Yet another feature or aspect of an illustrative example is believed at the time of the filing of this patent application to possibly reside broadly in the method of changing a volume of an enclosure in a trailer, wherein the step of moving the at least one movable inner wall further comprises moving at least one fixture.

Still another feature or aspect of an illustrative example is believed at the time of the filing of this patent application to possibly reside broadly in the method of changing a volume of an enclosure in a trailer further comprising a step of releasably securing the at least one movable inner at a first position.

A further feature or aspect of an illustrative example is believed at the time of the filing of this patent application to possibly reside broadly method of changing a volume of an enclosure in a trailer further comprising a step of releasably securing the at least one movable inner at second position.

One feature or aspect of an embodiment is believed at the time of the filing of this patent application to possibly reside broadly in a trailer insert comprising: a vertical movable inner wall configured to be inserted into a trailer; a moving and stabilizing device configured for the movement and stabilization of the vertical movable inner wall; the vertical movable inner wall being configured to move toward a front wall of the trailer to a first position and away from the front wall of the trailer to a second position; and the first position of the vertical movable inner wall defines an enclosure to have a first volume and the second position of the vertical movable inner wall defines the enclosure to have a second volume, wherein the first volume is less than the second volume.

Another feature or aspect of an embodiment is believed at the time of the filing of this patent application to possibly reside broadly in a trailer insert comprising at least one of a moveable inner wall portion extending from a vertical side edge of the vertical movable inner wall, a movable top wall portion extending from an upper horizontal side edge of the vertical movable inner wall, and a movable floor portion extending from a lower horizontal side edge of the vertical movable inner wall.

Yet another feature or aspect of an embodiment is believed at the time of the filing of this patent application to possibly reside broadly in a trailer insert comprising at least one fixture, furniture, or other appurtenance configured and disposed to move in the trailer with the movement of the vertical movable inner wall.

It should be understood that the foregoing relates to exemplary aspects of the disclosure and that modifications may be made without departing from the spirit and scope of the disclosure as set forth in the following claims.

NOMENCLATURE trailer 100
floor 102
a first sidewall 104
second sidewall 106
front wall 108
top wall 110
wheels 111
at least one movable inner wall 112
door 114
window 116
rear opening 118
table 120
track 133
wheels, castors, or slide 134
outer handle 136
inner handle 138
powered movement device 139
trailer 200
front wall 208
at least one movable inner wall 212
movable top wall portion 222
movable first sidewall portion 224
movable second sidewall portion 225
movable door 213
movable bottom wall portion 226
cabinets 228
lamp 230
seal 231
trailer insert 300
trailer 301
trailer floor 302
sidewall portion 304
trailer sidewall 306
mattress 307
front wall 308
hitch 309
trailer top wall 310
wheels 311
vertical movable inner wall 312
door 313
door 314
forward window 316
Trailer rear door 318
movable top wall portion 322
movable floor portion 326
seals 330
window 332
lamp 333
moving and stabilizing device 334
microwave oven 335
refrigerator 336
shelves 337
couch 339
first position P1
second position P2
first volume V1
second volume V2
forward position P1a
rearward position P2a
movement arrow "A"

The invention claimed is:

1. A trailer comprising: a floor; a first sidewall extending up from a first side of the floor; a second sidewall extending up from a second side of the floor; a front wall extending up from a front of the floor and joining with the first sidewall and the second sidewall; a top wall extending from the first sidewall, the second sidewall, and the front wall; a moveable inner wall configured to move toward the front wall to a first position and away from the front wall to a second position; the first position of the at least one movable inner wall defines an enclosure to have a first volume and the second position of the at least one movable inner wall defines the enclosure to have a second volume, wherein the first volume is less than the second volume; and at least one of a) and b) are:
  a) rollers, wheels, castors, or a track configured to cooperate with the at least one movable inner wall and to ease movement and stabilize the at least one moveable inner wall; and
  b) wherein the floor, the first sidewall, the second sidewall, and the top wall extend beyond the at least one movable inner wall when the at least one movable inner wall is in the first position.

2. The trailer of claim 1, wherein the first volume of the enclosure is configured to have a first use and the areas of the floor, the first sidewall, the second sidewall, and the top wall extending beyond the at least one movable inner wall, when the at least one movable inner wall is in the first position, is configured to have a second use, the first use being different than the second use.

3. The trailer of claim 2, wherein the first use is human habitation and the second use is a use other than human habitation.

4. The trailer of claim 1, wherein the floor, the first sidewall, the second sidewall, and the top wall extend beyond the at least one movable inner wall when the at least one movable inner wall is in the second position.

5. The trailer of claim 1 further comprising at least one movable inner sidewall portion extending from a vertical side edge of the at least one movable inner wall and toward the front wall.

6. The trailer of claim 1 further comprising a movable top wall portion extending from an upper horizontal side edge of the at least one movable inner wall and toward the front wall.

7. The trailer of claim 1 further comprising a movable floor portion extending from a lower horizontal side edge of the at least one movable inner wall and toward the front wall.

8. The trailer of claim 1 further comprising a rear wall extending from the first sidewall, the second sidewall, the floor, and the top wall, the rear wall being further from the front wall than the at least one movable inner wall.

9. The trailer of claim 8, wherein the rear wall comprises a door, a gate, a hatch, or another opening.

10. The trailer of claim 1, wherein the at least one movable inner wall comprises a door, a gate, a hatch, or another opening.

11. The trailer of claim 1, wherein at least one of the first and second sidewalls comprises a door, a gate, a hatch, or another opening.

12. The trailer of claim 1 further comprising at least one fixture configured and disposed to move with the at least one movable inner wall.

13. A method of changing a volume of an enclosure in a trailer,
  the trailer comprising:
    a floor;
    a first sidewall extending up from a first side of the floor;
    a second sidewall extending up from a second side of the floor;
    a front wall extending up from a front of the floor and joining with the first sidewall and the second sidewall;
    a top wall extending from the first sidewall, the second sidewall, and front wall; and
    at least one movable inner wall;
  the method comprising the steps of:
    positioning the at least one movable inner wall at a first position in a plane parallel with a plane of the front wall and substantially defining a first volume with the floor, the first sidewall, the second sidewall, the front wall, and the top wall of the trailer;
    moving the at least one movable inner wall toward the front wall and to a second position in a plane parallel with the plane of the front wall and substantially defining a second volume substantially with the floor, the first sidewall, the second sidewall, the front wall, and the top wall of the trailer, wherein the first volume is less than the second volume.

14. The method of claim 13, wherein the step of moving the at least one movable inner wall comprises rolling or sliding the at least one movable inner wall manually or by power.

15. The method of claim 13, wherein the step of moving the at least one movable inner wall further comprises moving at least one of a moveable inner wall portion extending from a vertical side edge of the at least one movable inner wall, a movable top wall portion extending from an upper horizontal side edge of the at least one movable inner wall, and a movable floor portion extending from a lower horizontal side edge of the at least one movable inner wall.

16. A trailer insert comprising:
  a vertical movable inner wall configured to be inserted into a trailer, the vertical movable inner wall being configured to extend proximate a bottom wall, a top wall, a first sidewall, and a second sidewall of the trailer;
  a moving and stabilizing device configured for the movement and stabilization of the vertical movable inner wall;
  the vertical movable inner wall being configured to move toward a front wall of the trailer to a first position in a first plane parallel with a plane of the front wall and away from the front wall of the trailer to a second position in a second plane parallel with the plane of the front wall; and
  the first position of the vertical movable inner wall defines an enclosure, substantially defined by the movable inner wall, the front wall, the top wall, the bottom wall, the first sidewall, and the second sidewall of the trailer, to have a first volume and the second position of the vertical movable inner wall defines the enclosure, substantially defined by the movable inner wall, the front wall, the top wall, the bottom wall, the first sidewall, and the second sidewall of the trailer, to have a second volume, wherein the first volume is less than the second volume.

17. The trailer insert of claim 16 further comprising at least one of a moveable inner wall portion extending from a vertical side edge of the vertical movable inner wall, a movable top wall portion extending from an upper horizontal side edge of the vertical movable inner wall, and a movable floor portion extending from a lower horizontal side edge of the vertical movable inner wall.

18. The trailer insert of claim 16 further comprising at least one fixture, furniture, or other appurtenance configured and disposed to move in the trailer with the movement of the vertical movable inner wall.

\* \* \* \* \*